United States Patent [19]

Smith et al.

[11] 4,278,558

[45] Jul. 14, 1981

[54] QUICK CURE CATALYST FOR POLYESTER MOLDING COMPOSITIONS

[75] Inventors: Donald C. Smith; Jack D. Hoffman, Both of Ft. Wayne, Ind.

[73] Assignee: Eagle-Picher Industries, Inc., Cincinnati, Ohio

[21] Appl. No.: 56,051

[22] Filed: Jul. 10, 1979

[51] Int. Cl.$^3$ ............................ C08K 5/14; C08J 3/24
[52] U.S. Cl. .................................. 252/186; 252/426; 264/DIG. 42
[58] Field of Search ................ 252/186, 426; 568/558; 264/DIG. 42

[56] References Cited

U.S. PATENT DOCUMENTS 4,202,790   5/1980   Steller .................................. 252/186

Primary Examiner—Deborah L. Kyle
Assistant Examiner—Irwin Gluck
Attorney, Agent, or Firm—Wood, Herron & Evans

[57] ABSTRACT

A catalyst for curing unsaturated polyester resins comprising a mixture consisting essentially of about 20 to 40% by weight of 2,5-dimethylhexane-2,5-diperoxybenzoate, about 10 to 25% by weight of tert-butyl peroxy (2-ethyl hexanoate), and about 40 to 65% by weight of tert-butylperoxy isopropyl carbonate.

12 Claims, No Drawings

QUICK CURE CATALYST FOR POLYESTER MOLDING COMPOSITIONS

FIELD OF THE INVENTION

This invention relates to the curing or hardening of thermosetting resins, and more particularly to a curing catalyst for unsaturated polyester molding resins which enables curing time to be substantially reduced from what has previously been required.

BACKGROUND OF THE INVENTION

Unsaturated thermosetting polyester resins are widely used in industry today for the production of moldings, for example automobile parts molded from sheets, electrical breaker boxes, appliance housings, business machine housings, and a wide range of reinforced parts. These resins are polycondensation products which are based on the reaction of dibasic acids with dihydric alcohols. Ethylenic unsaturation is incorporated in the resin, generally by use of an unsaturated acid (e.g. maleic anhydride; but a saturated acid such as isophthalic may also be present). The alcohol is typically saturated, e.g. propylene glycol. The unsaturated polyesters are usually crosslinked through their double bonds with a compatible monomer (such as styrene) which also contains ethylenic unsaturation, and thereby become thermoset. The polyester itself is often blended with a thermoplastic resin for modified characteristics; for example, a polyvinyl acetate/styrene resin and/or an acrylic resin such as polymethacrylate/styrene resins are commonly included as "low profile additives" to improve surface smoothness. (As used herein, the term "polyester resin" is meant to include not only the polyester itself but also the crosslinking monomer which is conventionally added to the polyester and any other modifying resin that is blended with the polyester). The molding material may also include a conventional filler, a mold release agent and/or a thickener.

To effect crosslinking of the polyester, a catalyst of the peroxide type is used. The catalyst is generally premixed with the resin prior to molding and is thermally activated upon molding to initiate the crosslinking reaction. In such case curing does not begin until the mixture containing the catalyst is exposed to activating temperatures typically in the range of 300° to 500° F.; the optimum temperature to be used depends upon the specific nature of the catalyst, the duration of the molding cycle, and other factors. In general, higher temperatures above an optimum level effect more rapid crosslinking, but may impair product qualities.

In the molding of polyester resins, a certain minimum "cure time" is required to expose the molding to the curing conditions sufficiently to effect the cure. In high volume production, this cure time is, in effect, a "bottleneck," because it slows the rate of molding; other things being equal, the longer the cure time, the lower the production rate from a given mold. In order to increase output without using additional molding equipment, the reduction of cure time is a substantial economic advantage.

THE INVENTION

This invention is based upon a new catalyst having three essential catalysing components, the use of which enables the cure time to be substantially reduced, while maintaining good product properties. In comparison to the catalyst previously used, cure time is enabled to be reduced by half, for example from 90 seconds to about 35–45 seconds, without adverse effect on product properties.

The new catalyst system is a synergistic mixture of three catalysts which individually are known per se:

(A) 2,5-dimethylhexane-2,5-diperoxybenzoate, sometimes also identified as 2,5-dimethyl-2,5 bis (benzoylperoxy) hexane, corresponding to the formula

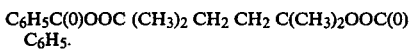

This material is sold commercially under the trademark "Luperox 118" by Lueidol Division of Pennwalt Corp.

(B) tert-butyl peroxy (2-ethylhexanoate), corresponding to the formula

This material is sold commercially under the trademark "Lupersol PDO" by Pennwalt.

(C) tert-butylperoxy isopropyl carbonate, sometimes also identified as OOt-butyl O-isopropyl mono peroxy carbonate, corresponding to the formula

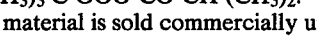

This material is sold commercially under the trademark "BPIC" by Pittsburgh Plate Glass Co.

These three components are used together in certain proportions to one another. The following proportions have been tested and have been found useful:

about 20 to 40% by weight of 2,5-dimethylhexane-2,5-diperoxybenzoate;

about 10-25% by weight of tert-butyl peroxy (2-ethyl hexanoate);

and about 40-65% of tert-butylperoxy isopropyl carbonate.

This three component catalyst system is incorporated in the polyester resin in an effective catalysing amount in generally the same manner as previously used catalysts, e.g., by premixing in a sheet holding resin. Expressed in terms of weight of catalyst to the total resin (including monomer in the resin, and blending resins) it has been tested in amounts of about 0.6 to 1.6 pounds of the three component catalyst (excluding solvents mixed with the catalyst) per 100 pounds resin, but the appropriate amount for any particular resin can easily be determined by a simple series of runs with different amounts. The curing can be carried out in the same equipment and by the same techniques, temperatures and pressures as have previously been used, except that the curing time is substantially shorter.

PRIOR ART

Each of the three components of this catalyst system is well known individually as a catalyst for use in curing polyester molding resins. It is also known to use a combination of two of them, components A and B, i.e., the Luperox 118 and the Lupersol PDO, for curing. So far as we are aware the three component combination has never been used.

Used individually the components of the three part catalyst will cure polyester resins but require substantially longer cure times than are required for the three component system of the invention. If component A, B, or C is used singly for curing, the cure time is slow, typically about 2 minutes at a dosage of 1 part per hundred parts resin. Components A and B previously been used together, with better results, but still poor in relation to this invention. For example, if components A and B are used together in the ratio of ½ pound of each per 100 pounds resin as has been previous practice, the optimum cure schedule has been about 90 seconds at 310° C. (At higher temperatures with that combination the surface appearance is unacceptable, in that it cannot properly be painted.)

In contrast, the three-part catalyst of this invention enables curing to be completed in about half the time, as shown by the Example I below. Thus, the use of these three catalyst components together enables the cure time to be greatly reduced.

Following are specific illustrations of the practice of the invention.

EXAMPLE I

The following example constitutes the preferred embodiment of using the catalysing system of this invention to cure a polyester molding resin that is widely used for the production of automobile parts.

A catalyst system was prepared by mixing 29.5% by weight of component A, 20.0% of component B, and 50.5% of component C. The resulting mixture is a liquid. (These proportions do not include solvent or diluent which may be included in the catalysts as purchased.)

The polyester resin to be cured comprised 46.1 parts by weight of an unsaturated polyester which was the product of condensing propylene glycol with maleic anhydride in a 1:1 mol ratio; 19.7 parts styrene monomer as the crosslinking agent; 34.2 parts of vinyl acetate/styrene and methacrylate/styrene resin, for a mixed polyester resin total of 100 parts. A conventional filler, calcium carbonate, was mixed with the molding resin in the proportion of 153.4 parts filler per 100 parts resin. A conventional thickener, magnesium hydroxide, was added in the ratio of 3.7 parts per 100 parts resin. A mold release agent, zinc stearate, was included in the proportion of 5.1 parts of 100 parts resin. The molding composition was reinforced with approximately 30% one inch chopped fiberglass roving. The catalyst was mixed into the resin by high shear mixing, in accordance with conventional mixing technique, in the proportion of 1.00 parts catalyst per 100 parts resin. The resulting composition was used to mold automobile grill opening panels 0.100–0.125" thick, in a compression mold. Each part was cured in a 45 second cycle (closed mold time), at a mold temperature of 330°–340° F. The resultant products displayed equal or better physical characteristics, in comparison to those obtained by use of the prior art catalyst described above:

| Property | Cure With A & B Alone | Fast Cure |
| --- | --- | --- |
| Flexural Strength | 23,000 psi | 23,500 psi |
| Flexural Modulus | 1.5 × 10⁶ psi | 1.5 × 10⁶ psi |
| Tensile Strength | 11,000 psi | 11,000 psi |
| Izod Impact Strength, Notched | 17.0 ft. lbs./in. notched | 17.5 ft. lbs/in. notched |

EXAMPLE II

In this example, the polyester resin comprised the condensation product of maleic anhydride and isophthalic acid with propylene glycol, at a 0.75/0.25/1.0 mol ratio, and 30% styrene monomer. The resulting composition was cured at the same temperatures and pressures noted previously, in 30–45 seconds.

EXAMPLES III & IV

Other catalyst mixtures were prepared as follows:

|  | III | IV |
| --- | --- | --- |
| Component A | 36.0% | 25% |
| Component B | 22.0% | 12.5% |
| Component C | 42.0% | 62.5% |
| Catalyst/resin ratio | .69/100 | 1.6/100 |

These were used to cure the resin described in Example I, at 330° F.

In each case good cures were effected in 30–45 seconds. Product qualities were comparable with those obtained with the A & B catalyst as used previously.

Those skilled in the art will understand that the inclusion of fillers, mold release agents and thickeners is generally conventional and is optional. Examples of other fillers which may be used include alumina ($Al_2O_3 \cdot 3H_2O$) and hydrated clays. Conventional mold release agents for thermosetting polyesters may be used such as calcium stearate. Thickeners may comprise the conventionally used oxides and hydroxides. The duration of the molding can be of course reduced by increasing molding temperature, however, increasing temperature tends to impair physical characteristics, as already noted.

Having described the invention, what is claimed is:

1. A catalyst for curing unsaturated polyester resins, said catalyst comprising a mixture consisting essentially of
   about 20 to 40% by weight of 2,5-dimethylhexane-2,5-diperoxybenzoate,
   about 10 to 25% by weight of tert-butyl peroxy (2-ethyl hexanoate), and
   about 40 to 65% by weight of tert-butylperoxy isopropyl carbonate.

2. A catalyst for curing unsaturated polyester resins, said catalyst comprising a mixture consisting essentially of,
   about 29.5% by weight 2,5-dimethylhexane-2,5-diperoxybenzoate,
   about 20.0% tert-butyl peroxy (2-ethyl hexanoate), and
   about 50.5% tert-butylperoxy isopropyl carbonate.

3. In the process of producing molded articles from an unsaturated polyester resin wherein a catalyst is mixed with said resin, the mixture is molded to desired shape and is subjected to elevated temperature for curing,
   the improvement comprising,
   catalysing said resin with an effective curing amount of a catalyst consisting essentially of about 20 to 40% by weight of 2,5-dimethylhexane-2,5-diperoxybenzoate, 10 to 25% by weight of tert-butyl peroxy (2-ethyl hexanoate), and 40 to 65% by weight of tert-butylperoxy isopropyl carbonate.

4. The process of claim 3 wherein said catalyst is present in a ratio of about 0.6 to 1.6 parts by weight of catalyst per 100 parts by weight of said resin.

5. The process of claim 3 wherein said resin is a blend comprising approximately 46% unsaturated polyester resin, 20% styrene monomer, and 34% mixed vinyl acetate/styrene and methacrylate/styrene resin.

6. The process of claim 3 wherein said polyester resin comprises the reaction product of propylene glycol and maleic anhydride.

7. The process of claim 6 wherein said polyester resin comprises the reaction product of propylene glycol and maleic anhydride in an approximate 1:1 mol ratio.

8. The process of claim 3 wherein said polyester resin comprises the reaction product of isophthalic acid, maleic anhydride and propylene glycol.

9. The process of claim 8 wherein said polyester resin comprises the reaction product of isophthalic acid, maleic anhydride, and propylene glycol in a 0.75/0.25/1.0 mol ratio.

10. The process of claim 3 wherein said polyester resin comprises about 70% of an unsaturated polyester resin and about 30% by weight of styrene monomer.

11. The process of claim 3 wherein said catalyst comprises about 29.5% 2,5-dimethylhexane-2,5-diperoxybenzoate, 20.0% tert-butyl peroxy (2-ethyl hexanoate), and 50.5% tert-butylperoxy isopropyl carbonate.

12. The process of claim 3 wherein said catalyst is mixed with said resin in a ratio in the range of about 1.0 part by weight of said catalyst per 100 parts of said resin.

* * * * *